United States Patent Office
3,462,516
Patented Aug. 19, 1969

3,462,516
BLENDS OF A LIQUID DIENE POLYMER AND MALEIC ANHYDRIDE COPOLYMER
Robert L. Smith and Jerry T. Gruver, Bartlesville, Okla., assignors to Phillips Petroleum Company, a corporation of Delaware
No Drawing. Filed Aug. 31, 1964, Ser. No. 393,382
Int. Cl. C08f 33/08, 45/72
U.S. Cl. 260—887                                    14 Claims

ABSTRACT OF THE DISCLOSURE

Cured polymers of conjugated dienes, having an increased tensile product, are made by first mixing the polymer, having either carboxy or hydroxy terminal groups, with a copolymer of maleic anhydride and a vinyl monomer, and then curing the resulting blend.

---

This invention relates to a method of blending polymeric materials with a copolymer prior to curing the polymeric material. In one of its aspects, the invention relates to the process of blending polymeric materials with a copolymer of maleic anhydride and a vinyl monomer. In another aspect, this invention relates to the resulting cured products of this process having an improved tensile product. In another aspect, the invention relates to a process for curing telechelic polymers having either carboxy or hydroxy terminal groups, which have previously been blended with a copolymer of maleic anhydride and methyl vinyl ether. In another aspect, this invention relates to novel compositions of cured telechelic polymers. In yet another aspect of this invention, this invention relates to a method for the preparation of novel compositions which comprises commingling a liquid polymer of a conjugated diene having either carboxy or hydroxy terminal groups with a copolymer of styrene and maleic anhydride.

Many polymeric materials, particularly the unsaturated rubbery polymers, require a curing or cross-linking treatment to place them in a useful condition or extend the scope of their usefulness. Although possessing good elastomeric properties, the cured products have quite a low tensile product, which is obtained by multiplying tensile strength and elongation of the polymer. However, there are many uses for a material that possesses a high tensile product. Examples of such applications are calking compounds used as sealants for the windshields in automobiles, for window glasses, for swimming pools, and the like. We have found that cured blends of liquid butadiene polymers, having either carboxy or hydroxy terminal groups, incorporated with white fillers such as alumina, titanium dioxide, zinc oxide, magnesium oxide, and the like do not always have the requisite tensile product to be useful in the applications described hereinabove.

Polymers of conjugated dienes, having either carboxy or hydroxy terminal groups, range from free-flowing liquids to rubbery products. This invention is related to using the polymers which are in the liquid state. When these polymers are cured with the conventional curing agents described hereinafter, they are found to exhibit a low tensile product. It has been the practice to add carbon black to the curing mixture to function as a reinforcing filler in order to increase the tensile product of the resulting cured product. However, this carbon black decreases the elastomeric properties of the polymer and in addition to which its dark color makes it unusable for environments requiring a light-colored elastomeric material. This invention in brief provides a method for increasing the tensile product of the resulting cured polymer without the need for a carbon black filler by blending the polymer with a copolymer of maleic anhydride and a vinyl monomer and curing the resulting blend in a conventional manner.

Accordingly, it is an object of the present invention to provide a novel copolymer composition having a good tensile product. It is another object of this invention to provide a method for mixing a liquid polymer of a conjugated diene with a copolymer of maleic anhydride and a vinyl monomer and for curing the mixture to an elastomeric product possessing high tensile properties without decreasing its elasticity. Another object of this invention is to provide a method of curing polymers to give products of high elasticity having improvement in their tensile properties.

Other objects, aspects, and advantages of this invention will be readily appreciated as the same becomes better understood by reference to the following detailed description.

According to the present invention we have developed a method for increasing the tensile product of cured polymers of conjugated dienes by first mixing the polymer, having either carboxy or hydroxy terminal groups, with a copolymer of maleic anhydride and a vinyl monomer, and thereafter curing the resulting blend in the presence of a filler at an elevated temperature. In the products of our invention, the presence of a filler is not mandatory. The invention is limited to those liquid conjugated diene polymers which have a bulk viscosity of 50–5000, preferably 200-2000 poises, and which have an average of one and one-half or more terminal groups.

The particular liquid polymers of conjugated dienes used in this invention can be prepared by any suitable means. One procedure for such synthesis involves solution polymerization of the diene in the presence of an alkali metal catalyst.

The general reaction can be illustrated graphically as follows:

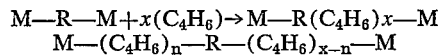
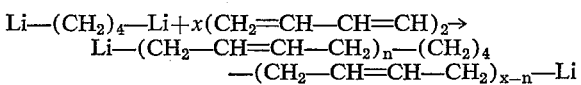

or combinations thereof in which M—R—M is an organoalkali metal compound. A specific example is:

Li—(CH$_2$)$_4$—Li+$x$(CH$_2$=CH—CH=CH)$_2$→
   Li—(CH$_2$—CH=CH—CH$_2$)$_n$—(CH$_2$)$_4$
       —(CH$_2$—CH=CH—CH$_2$)$_{x-n}$—Li

In the specific example, 1,4-addition of butadiene is shown; however, it should be understood that 1,2-addition and combinations of 1,4 and 1,2-addition can also occur.

Treatment of this resulting polymer with carbon dioxide and a mineral acid results in the lithium atoms being replaced by a carboxy group with the lithium separating as the salt of the acid. Thereby such treatment results in a carboxy-terminated polymer. A hydroxy-terminated polymer containing reactive hydroxy end groups can be obtained by reacting the polymer having the terminal lithium atoms with an epoxy compound at elevated temperatures, followed by treatment with a mineral acid to replace the lithium atoms with hydrogen atoms.

Formation of these terminally reactive polymers is generally carried out at a temperature in the range of between —100° and +150° C., preferably between —75° and +75° C. The particular temperatures employed will depend upon both the monomers and the initiators used in preparing the polymers and one skilled in the art would have no difficulty in choosing the particular initiator and the particular pressures and temperatures necessary to achieve a particular result. This is well within the knowledge of the art. The amount of catalyst employed can vary but is preferably in the range of between about 1 and about 30 millimoles per 100 grams of monomer. It is preferred that the polymerization be carried out in the presence of a suitable diluent such as benzene, toluene, cyclohexane, xylene, n-butane or the like. Generally the diluent is selected from hydrocarbons such as paraffins, cycloparaffins, and aromatics containing from 4 to 10 carbon atoms per molecule.

After these terminally reactive polymers have been prepared as hereinabove described, we proceed to blend them with a copolymer prepared by polymerizing a mixture of maleic anhydride and a vinyl monomer selected from a group consisting of styrene, alpha-methyl styrene, vinylnaphthalene, vinyl acetate, vinyl chloride, vinylidene chloride, acrylonitrile, butadiene, and the vinyl alkyl ethers having 1 to 5 carbon atoms in the alkyl group, and in which the molecular weight is 300 to 300,000, preferably 450 to 75,000.

The copolymers prepared by polymerizing a mixture of maleic anhydride and a vinyl monomer can be added to or incorporated into the terminally active butadiene polymer by blending the ingredients by means known to the art, such as on a paint mill or in a Banbury mixer. Ordinarily 1 to 100 parts of copolymer per 100 parts of liquid polymer is employed; however, a preferred range runs between 5 and 60 parts of copolymer per 100 parts of liquid polymer. After this blending step the resulting mixture of polymer and copolymer is subjected to a curing step wherein any of the well-known curing agents are employed. The curing agent used can be selected from among those normally used for curing the carboxy and hydroxy terminated liquid polymers. These curing agents may be one from the group consisting of aziridinyl-substituted triazines and triphosphatriazines which are represented graphically by the following formulas:

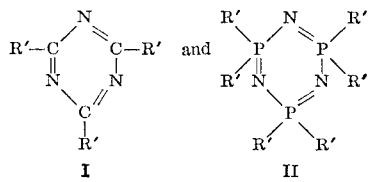

wherein R′ is a radical selected from the group consisting of a 1-aziridinyl radical, which can be represented by the formula:

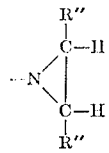

hydrogen, an alkyl, cycloalkyl, aryl, aralkyl, and alkaryl radical, each hydrocarbon radical containing from 1 to 12 carbon atoms, and the R″ radicals are selected from the group consisting of hydrogen, alkyl, cycloalkyl, aryl, aralkyl, and alkaryl radicals, can be alike or different, and can contain up to and including a total of 20 carbon atoms. In the foregoing formulas, at least three of the R′ groups are 1-aziridinyl radicals. Thus, each of the R′ groups in Formula I is an aziridinyl radical.

Examples of compounds represented by Formula I are:

2,4,6-tri(1-aziridinyl)-1,3,5-triazine,
2,4,6-tri(2-methyl-1-aziridinyl)-1,3,5-triazine,
2,4,6-tri(2-methyl-3-benzyl-1-aziridinyl)-1,3,5-triazine,
2,4,6-tri(2-phenyl-3-benzyl-1-aziridinyl)-1,3,5-triazine.

Examples of compounds represented by Formula II include the following:

2,4,6-tri(2,3-dimethyl-1-aziridinyl)-2,4,6-triphospha-1,3,5-triazine,
2,4,6-tri(2-methyl-3-octyl-1-aziridinyl)-2,4,6-triphospha-1,3,5-triazine,
2,2,4,4,6,6-hexa(2-methyl-(1-aziridinyl))-2,4,6-triphospha-1,3,5-triazine, hereinafter referred to as hexa(2-methyl-1-aziridinyl)-triphosphatriazine (HMAT),
2,2,4,4,6,6-hexa(2,3-diethyl-1-aziridinyl)-2,4,6-triphospha-1,3,5-triazine.

We can also employ organic peroxides in conjunction with aziridinyl-substituted triazines and triphosphatriazines, hereinabove described having the general formula:

$$R'''—O—O—R'''$$

wherein each R‴ is selected from the group consisting of alkyl, cycloalkyl, aryl, alkaryl, aralkyl, and acyl radicals containing from 1 to 15 carbon atoms. Examples of suitable organic peroxides include:

Dimethyl peroxide,
Diacetyl peroxide,
Dibenzoyl peroxide,
Bis(alpha,alpha-diisopropylbenzyl)peroxide,
Bis(alpha,alpha-diethyl-4-isopropylbenzyl)peroxide.

Polyepoxide compounds containing at least three epoxy groups

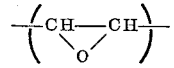

these groups being units in an open chain hydrocarbon or as branches therefrom, are also suitable as curing agents in our process. The percent epoxy oxygen in these epoxides will usuallly exceed 0.5 percent and will preferably be in the range from 2–12 percent or higher. Typical of such compounds are triepoxyhexane, triepoxydecane, and the like.

Curing of the polymer-copolymer blend with the various curing agents can be carried out over a wide temperature range, e.g., from about 40° to 500° F., with the preferred temperature in the range from 150° to 400° F. The curing agents are set out herein, and one skilled in the art, in possession of this disclosure and having studied the same, will recognize which particular ones can be compatibility used in our curing operation and which temperatures and curing times are necessary to achieve a cured polymer.

Fillers which are compatible with this invention include aluminum oxide, magnesium oxide, barium sulfate, calcium carbonate, bentonite, clay, and the like.

The following examples are presented in illustration of the invention. However, the specific materials and conditions used are typical only and should not be construed to limit the invention unduly.

EXAMPLE I

A number of blends were prepared on a three-roll paint mill using a copolymer consisting of maleic anhydride and methyl vinyl ether having a molecular weight of about 40,000 and a carboxy-terminated liquid polybutadiene having a bulk viscosity of 350 poises. The blends were cured for two hours at 200° F. with hexa(2-methyl (1-aziridinyl))triphosphatriazine (hereinafter HMAT). The copolymer of maleic anhydride and methyl vinyl ether has a tensile strength of 2800 p.s.i. at 80° F. and an elongation of 0.6 percent which gives it a tensile product of 17 p.s.i. at 80° F. Its tensile product was not changed when reacted with HMAT. The copolymer is completely incompatible with the liquid telechelic butadiene polymer prior to curing the mixture. Surprisingly, however, when this incompatible mixture is cured with the HMAT agent, the resulting product has a tensile product ranging from 720 to 1,420 p.s.i. which would indicate that the copolymer is linked with the liquid telechelic butadiene polymer by the curing agent. The conventional thickening agents or fillers do not cause such a striking and unexpected increase in the tensile product of the cured elastomer.

The various runs were distinguishable in the concentration of the copolymer with the polybutadiene (col. 2 in the table). The blends were subsequently tested for their tensile strength, their elastomeric property (percent elongation), and the resulting tensile product, and these results are tabulated in Table I, which shows: (1) that the cured blends have a considerably higher tensile product than does the cured carboxy-terminated butadiene (runs 1–4); (2) that the elongation of the resulting cured carboxy-terminated butadiene is not affected by the addition of the copolymer of maleic anhydride and methyl vinyl ether; (3) that a plasticizer can be used in such blends with considerable retention of tensile product (runs 5–6); (4) that carbon black or carbon black and a plasticizer can be present and that such blends have a good tensile product for those applications not requiring light-colored material; (5) that low tensile product results in the cured blend of carboxy-terminated liquid polybutadiene when conventional light-colored fillers are employed as shown in run 12.

maleic anhydride vinyl monomer copolymer alone or the butadiene polymer cured alone. That the effect of adding the maleic anhydride copolymer was synergistic is shown by the fact that a blend containing 50 parts by weight of the copolymer per 100 parts of carboxy-terminated polybutadiene had a tensile product of 1420, compared with 17 and 224 for the individual polymers. Blends cured in the manner taught by our discovery compare favorably with those blends cured with carbon black without suffering the disadvantage of imparting a dark coloration to the finished product.

Obviously many modifications and variations of the present invention are possible in the light of the above teachings. It is therefore to be understood that within the scope of the appended claims the invention may be practiced otherwise than is specifically described herein.

TABLE I

| Run No. | Parts per 100 parts of carboxy-terminated polybutadiene | | | | ASTM D412-61T, Instron tensile machine | | |
|---|---|---|---|---|---|---|---|
| | Copolymer | Filler | Philrich 5 [5] | HMAT | Tensile strength, p.s.i., 80° F. | Percent elongation | Tensile product, p.s.i., 80° F. |
| 1 | | | | 6 | 140 | 160 | 224 |
| 2 | 20 | | | 6 | 450 | 160 | 720 |
| 3 | 30 | | | 6 | 700 | 150 | 850 |
| 4 | 50 | | | 12 | 1,020 | 140 | 1,420 |
| 5 | 50 | | 25 | 6 | 615 | 160 | 984 |
| 6 | 50 | | 50 | 6 | 470 | 190 | 893 |
| 7 | | 1 50 | | 6 | 1,410 | 125 | 1,762 |
| 8 | 50 | 1 50 | | 6 | 1,550 | 85 | 1,317 |
| 9 | 100 | 1 50 | 50 | 6 | 1,060 | 80 | 848 |
| 10 | | 2 70 | 40 | 6 | 1,200 | 220 | 2,640 |
| 11 | 50 | 2 70 | 40 | 6 | 1,150 | 100 | 1,150 |
| 12 | | 3 50 | | 4 6 | 300 | 150 | 450 |

[1] A high abrasion furnace black.
[2] A super-processing furnace black.
[3] Magnesium oxide.
[4] Cured at 250° F. instead of 200° F.
[5] A highly aromatic oil plasticizer.

EXAMPLE II

Blends were prepared as in Example I; however, a styrene-maleic anhydride copolymer having a molecular weight of 700 was used, and the blends were cured 30 minutes at 250° F. with hexa(2-methyl(1-aziridinyl))triphosphatrizine (HMAT). The various runs were distinguishable in the concentration of the copolymer with the polybutadiene (col. 2 in Table II). The blends were subsequently tested for their tensile product and their results are tabulated in Table II. As in Example I, these runs show that the blends have higher tensile products than does the cured carboxy-terminated polybutadiene.

TABLE II

| Run No. | Parts per 100 parts of carboxy-terminated polybutadiene | | | | ASTM D412-61T, Instron tensile machine | | |
|---|---|---|---|---|---|---|---|
| | Copolymer | Filler | Philrich 5 | HMAT | Tensile strength, p.s.i., 80° F. | Percent elongation | Tensile product, p.s.i., 80° F. |
| 14 | | | | 6 | 150 | 160 | 240 |
| 15 | 10 | | | 6 | 185 | 160 | 296 |
| 16 | 25 | | | 6 | 305 | 150 | 457 |
| 17 | 50 | | | 6 | 595 | 140 | 833 |

The tensile product of the cured blends of other terminally reactive polymers having terminal acidic groups such as:

| | |
|---|---|
| SOH | SbOH |
| $SO_2H$ | $SbO_3H$ |
| $SO_3H$ | $TeO_2H$ |
| $SeO_2H$ | $TeO_3H$ |
| $SeO_3H$ | $AsO_2H$ |
| $LiO_2H$ | AsOH |
| $SnO_2H$ | $AsO_3H_2$ |
| $SbO_2H$ | $AsO_3H_3$ | with the copolymer described hereinabove is also appreciably greater than that of the cured polymer alone.

In summary, we have discovered that the mixing of a maleic anhydride-vinyl monomer copolymer with a butadiene polymer having reactive terminal groups prior to the curing of said polymer produces a cured blend which possesses a higher tensile product than either the

We claim:
1. A process for the preparation of a novel composition which comprises mixing a liquid polymer of a conjugated diene having an average of at least 1.5 terminal carboxy or hydroxy groups and a bulk viscosity of 50 to 5000 poises; with from 1 to 100 parts per 100 parts of said liquid polymer of a copolymer of maleic anhydried and a vinyl monomer having a molecular weight of 300 to 300,000 and a curing agent selected from

(1) compounds having the formula

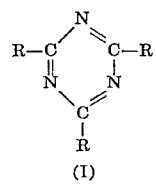

(I)

(2) compounds having the formula

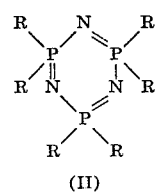

(II)

where in Formulas I and II each R is a radical selected from the group consisting of a 1-aziridinyl radical, represented by the formula

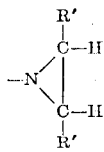

hydrogen, an alkyl, cycloalkyl, aryl, aralkyl, and alkaryl radical, each hydrocarbon radical containing from 1 to 12 carbon atoms, and each R' is selected from the group consisting of hydrogen, alkyl, cycloalkyl, aryl, aralkyl, and alkaryl radicals, all the R groups in each aziridinyl radical containing up to and including a total of 20 carbon atoms, at least three of the R groups of Formulas I and II being 1-aziridinyl radicals, or (3) polyepoxide compounds containing at least three epoxy groups

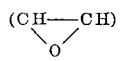

these groups being units in an open chain hydrocarbon or as branches therefrom, and heating to a temperature sufficient to cure said composition.

2. A composition made according to the process of claim 1.

3. A process according to claim 1 wherein said curing agent can be employed with an organic peroxide having the formula R'''—O—O—R''' wherein each R''' can be an alkyl, cycloalkyl, aryl, alkaryl, aralkyl or acyl radical having from 1 to 15 carbon atoms.

4. A process according to claim 1 wherein said vinyl monomer can be styrene, alpha-methyl styrene, vinylnaphthalene, vinyl acetate, vinyl chloride, vinylidene chloride, acrylonitrile, butadiene or vinyl alkyl ether having 1 to 5 carbon atoms in the alkyl group.

5. A process according to claim 4 wherein said polymeric material is a polymer of butadiene containing terminal carboxy groups.

6. A composition prepared by the process of claim 5.

7. A process according to claim 5 wherein said copolymer is a copolymer of maleic anhydride and methyl vinyl ether.

8. A process according to claim 5 wherein said copolymer is a copolymer of maleic anhydride and styrene.

9. A process according to claim 4 wherein said polymeric material is a polymer of butadiene containing terminal hydroxy groups.

10. A composition prepared by the process of claim 9.

11. A method according to claim 1 wherein said liquid polymer is a polymer of butadiene having an average of at least 1.5 terminal hydroxy groups and a bulk viscosity of 50 to 5000 poises and wherein said vinyl monomer can be styrene, alpha-methyl styrene, vinylnaphthalene, vinyl acetate, vinyl chloride, vinylidene chloride, acrylonitrile, butadiene or vinyl alkyl ethers having 1 to 5 carbon atoms in the alkyl group.

12. A process according to claim 11 wherein said copolymer is a copolymer of vinyl methyl ether and maleic anhydride.

13. A process according to claim 12 wherein said copolymer is a copolymer of maleic anhydride and styrene.

14. A process according to claim 11 wherein the curing agent is hexa(2 - methyl(1 - aziridinyl))triphosphatriazine.

References Cited

UNITED STATES PATENTS

| 2,614,093 | 10/1952 | Wheelock | 260—892 |
| 3,017,280 | 1/1962 | Yudelson | 260—78.5 |
| 3,097,193 | 7/1963 | Gruver | 260—94.7 |
| 3,305,523 | 2/1967 | Burnside | 260—94.7 |

GEORGE F. LESMES, Primary Examiner

K. E. KUFFNER, Assistant Examiner

U.S. Cl. X.R.

260—33.6, 41.5, 78.5, 94.7, 836, 879, 894